United States Patent [19]

Eckley

[11] Patent Number: 4,740,963
[45] Date of Patent: Apr. 26, 1988

[54] VOICE AND DATA COMMUNICATION SYSTEM

[75] Inventor: Gordon P. Eckley, Corona, Calif.

[73] Assignee: Lear Siegler, Inc., Santa Monica, Calif.

[21] Appl. No.: 824,067

[22] Filed: Jan. 30, 1986

[51] Int. Cl.$^4$ ............................................... H04J 3/12
[52] U.S. Cl. ..................................... 370/110.1; 370/84
[58] Field of Search ................... 370/110.1, 13, 15, 87, 370/65, 110.4, 109, 111, 118, 84

[56] References Cited

U.S. PATENT DOCUMENTS

| | | | |
|---|---|---|---|
| 4,231,100 | 10/1980 | Eggermont | 370/109 |
| 4,347,607 | 8/1982 | Nixon et al. | 370/111 |
| 4,479,213 | 10/1984 | Galand et al. | 370/110.1 |

OTHER PUBLICATIONS

Violino, Bob, "PacBell Files Patent For 'Breakthrough' Device," *Communications Week*, Mar. 18, 1985.

Primary Examiner—Douglas W. Olms
Assistant Examiner—Wellington Chin
Attorney, Agent, or Firm—Pretty, Schroeder, Brueggemann & Clark

[57] ABSTRACT

A telephone communication system for transmitting and receiving both voice signals and digital data signals, with no significant distortion to the voice signals and with substantially higher digital data rates than previously could be obtained in comparable systems. The voice signals are digitized, data compressed, and time-division multiplexed with the digital data signals, to produce a composite digital signal that can be transmitted over conventional telephone lines. The system can be selectively configured in a conventional telephone operating mode, in which the system transmits and receives merely the analog voice signals and all of its various digital circuitry elements are bypassed. The system is automatically configured in this conventional telephone operating mode whenever a significant failure in any of its individual units is detected.

34 Claims, 5 Drawing Sheets

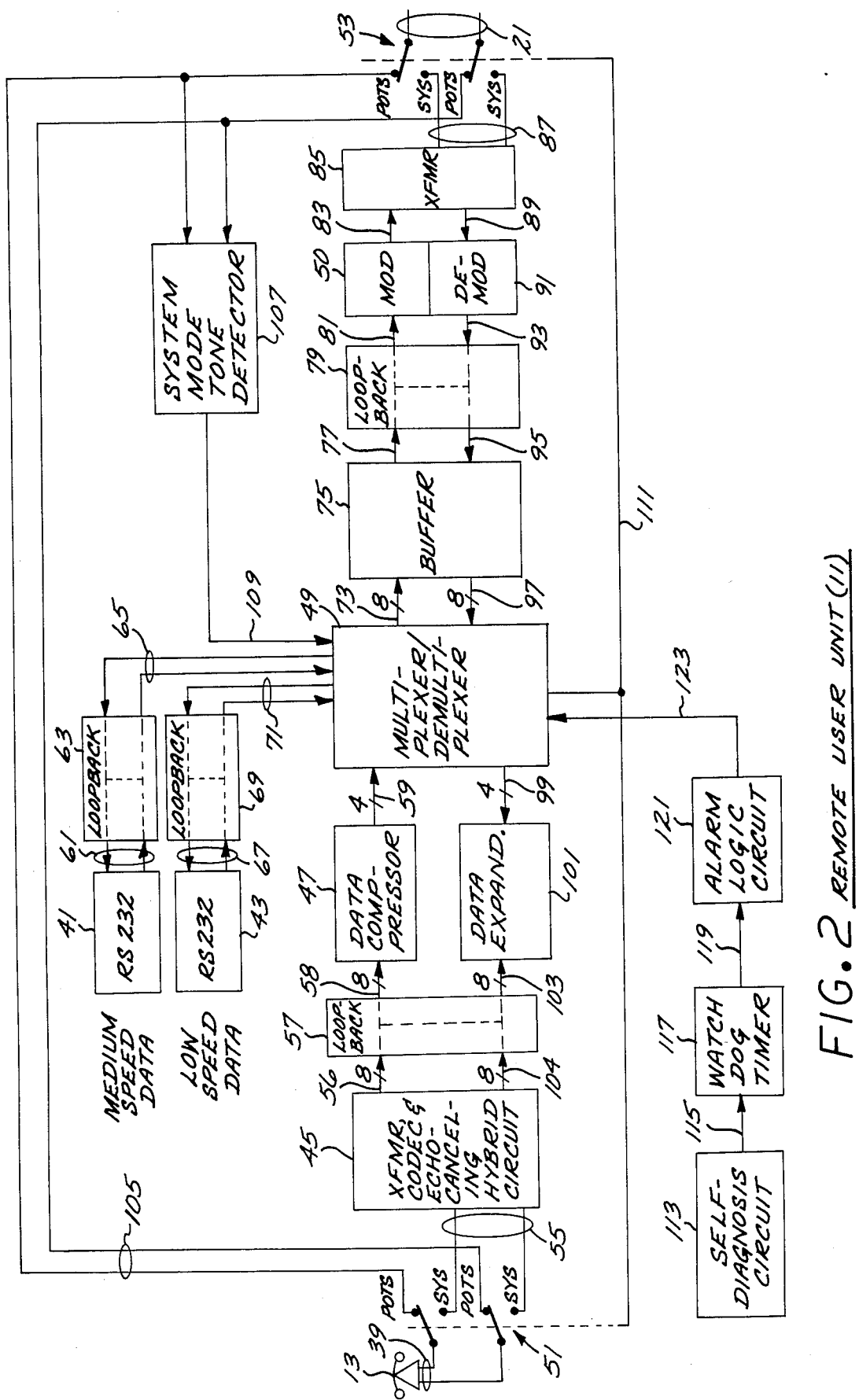
FIG. 2 REMOTE USER UNIT (11)

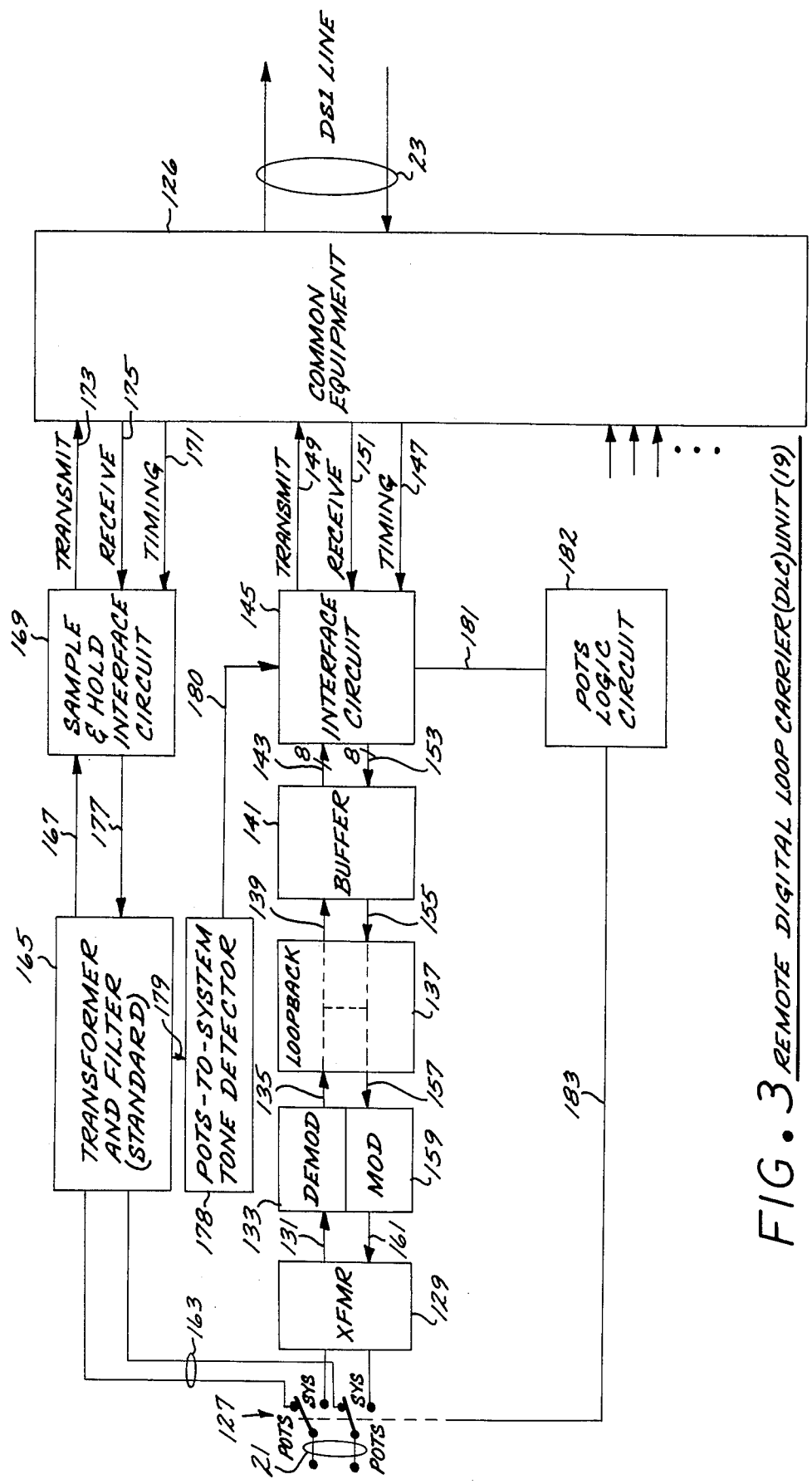
FIG. 3 REMOTE DIGITAL LOOP CARRIER (DLC) UNIT (19)

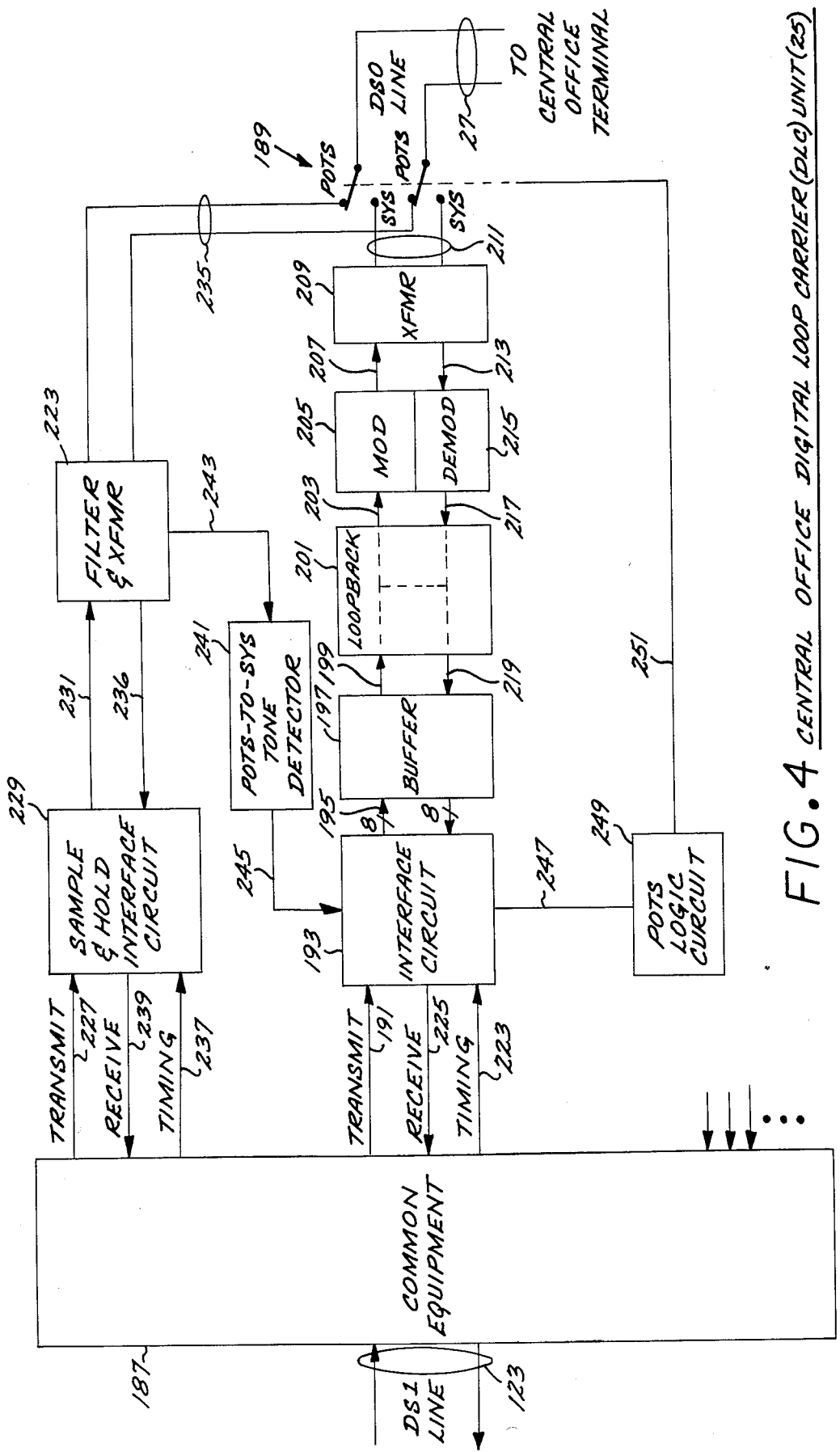
FIG. 4 CENTRAL OFFICE DIGITAL LOOP CARRIER (DLC) UNIT (25)

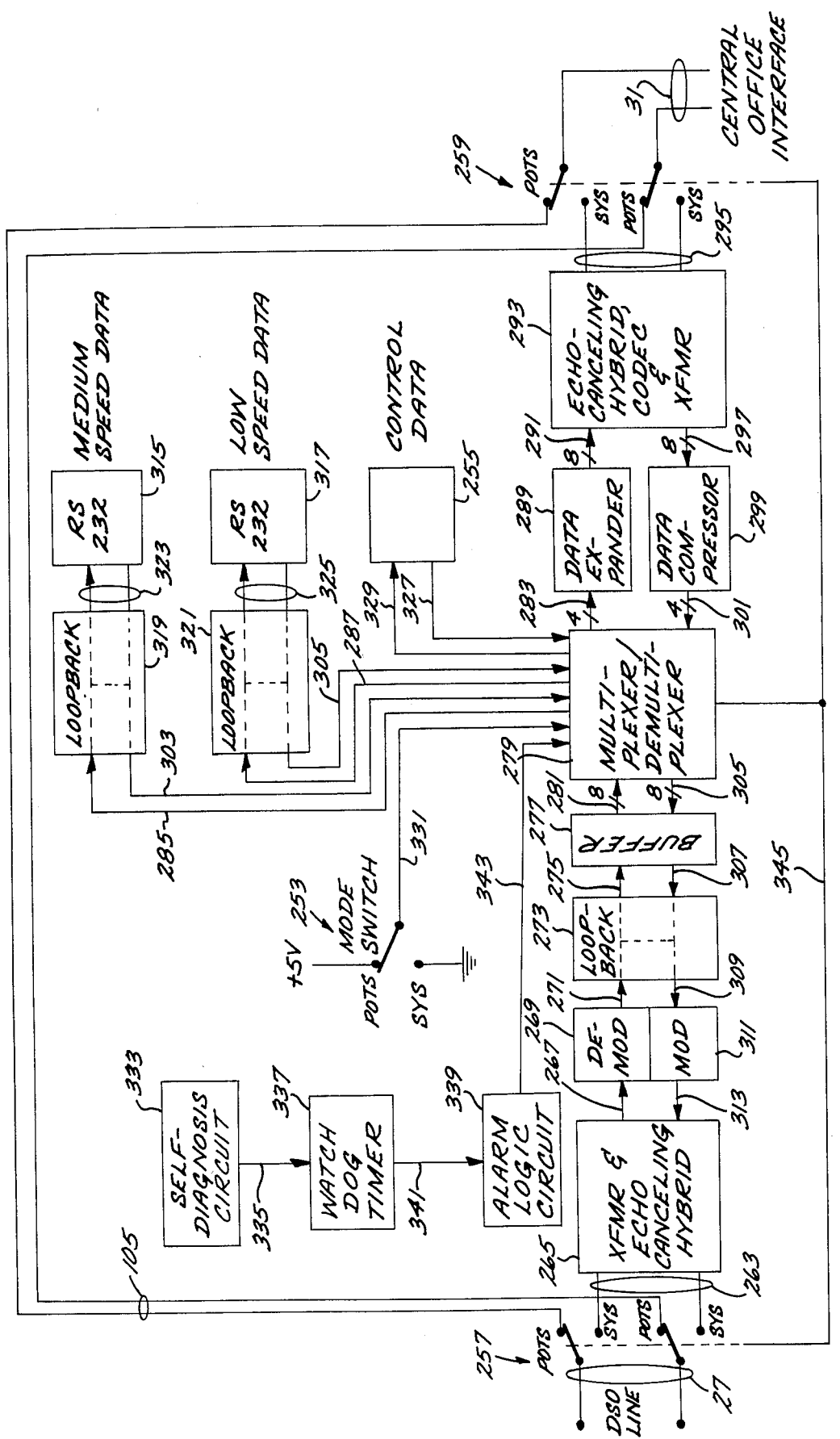
FIG. 5 CENTRAL OFFICE TERMINAL (29)

4,740,963

VOICE AND DATA COMMUNICATION SYSTEM

BACKGROUND OF THE INVENTION

This invention relates generally to telephone voice communication systems, and, more particularly, to systems that multiplex together both voice and digital data signals.

Typical telephone voice communication systems include a great number of remote users, each with its own remote telephone unit interfacing with a dedicated two-wire, full-duplex line. A central office apparatus receives the analog voice signal transmitted from each user and transmits back a corresponding analog voice signal over the same full-duplex line. The central office apparatus includes an analog switch array for routing the individual voice signals to their desired destinations.

Many such telephone voice communication systems include intermediate digital loop carrier (DLC) units that group together the analog voice signals received from a number of separate remote users and time-division multiplexes these signals onto a single carrier, for transmission over a relatively long distance to the system's central office. A corresponding DLC unit located at the central office demultiplexes this signal to recover the original analog voice signal for each user. These two DLC carrier units perform the same functions for voice signals traveling in the opposite direction, i.e., toward the various remote users.

Interest has recently been expressed in adapting each remote user's equipment to transmit simultaneously both a voice signal and a digital data signal over a common full-duplex line to the central office. The voice and data signals are separated there and routed to separate destinations. There particularly has been expressed an interest in transmitting two digital data signals along with the voice signal from each user. One such digital data signal would have a relatively low data rate suitable, for example, for carrying signaling information for water meters, burglar and fire alarms and the like. The other data signal would have a higher data rate suitable, for example, for transmitting data to and from a personal computer or the like.

The usual technique for simultaneously transmitting both voice and digital data is to transmit the signals on different lines or to frequency-division multiplex them together on a single line. In the latter case, the voice signal is ordinarily retained in its analog format, with a limited bandwidth, and the two digital data signals are modulated onto different subcarriers at frequencies spaced above the voice signal. Although such a system is generally effective at simultaneously transmitting and receiving both voice and digital data signals, it has not been proven to be entirely satisfactory. The quality of the voice signal is unduly distorted by the band limiting, and the upper limits on the data rates of the two digital data signals is considered to be unduly low.

It should therefore be appreciated that there is a need for a communication system that can transmit and receive both voice and digital data signals without any undue distortion to the voice signal and without any undue limits on digital data rates. The present invention fulfills this need.

SUMMARY OF THE INVENTION

The present invention is embodied in a voice communication system, and a related method, for transmitting simultaneously both a voice signal and a digital data signal, with reduced distortion to the voice signal and with a higher digital data rate than was previously achieved for a given combined bandwidth. The system includes a remote user unit having analog-to-digital (A/D) converter means for digitizing an analog voice signal received, for example, from an external telephone unit, and data compression means for reducing the data rate of the digitized signal. Multiplexer means time-division multiplexes the compressed voice signal with a first digital data signal to produce a composite digital signal having a data rate substantially the same as the original digitized voice signal. Selector means selectively connects either the analog voice signal or the composite digital signal to an output terminal, for transmission to a central office.

The voice communication system of the invention is preferably adapted for use in a telephone system that simultaneously transmits and receives signals over a common full-duplex line. In this telephone system, the transmit composite signal is transmitted from the remote user unit to a central office terminal for decoding and routing to the appropriate destinations, and a corresponding receive composite signal is received simultaneously in return. To process the receive composite signal, the remote user unit further includes demultiplexer means for time-division demultiplexing the signal to produce a receive compressed voice signal and a receive digital data signal. Data expansion means decompresses the receive compressed voice signal, and digital-to-analog (D/A) converter means converts the decompressed voice signal to a corresponding receive analog voice signal. This latter signal can be transmitted to the external telephone unit. For use in cases where the receive composite signal contains an analog voice signal alone, the selector means selectively directs the receive signal directly to the telephone unit, bypassing the demultiplexer, data expansion, and D/A converter means.

The central office terminal receives composite digital signals transmitted from a number of remote users and initially separates the compressed voice signal from the digital data signal in each composite signal it receives. At the central office terminal, the separated digital data signals are directed to appropriate output terminals for further transmission, and the separated compressed voice signals are converted back into their original analog voice formats. These re-created analog voice signals are transmitted to a suitable switch array for routing to their appropriate destinations.

In many instances, it is desirable to group together the composite digital signals produced by a number of separate remote users, for transmission a great distance over a common line to the central office. To accomplish this, a digital loop carrier (DLC) unit having multiplexer means is included to time-division multiplex together the various composite signals. A corresponding DLC unit having corresponding demultiplexer means is located at the central office, for again separating the composite signals from each other. Signaling bits can be removed from the interleaved composite signals transmitted over the link between the two DLC units. In a symmetrical fashion, the multiplexer and demultiplexer means of these two DLC units can similarly transmit a corresponding plurality of interleaved composite signals in the opposite direction, toward the remote users.

In one aspect of the invention, the selector means located at each remote user unit includes means for sensing a failure in predetermined ones of its constituent elements and for selectively connecting the analog voice signal to the unit's output terminal when that occurs. The received signal is likewise connected directly to the external telephone unit or other voice input when that occurs, thus bypassing the means where a failure has been detected.

In another aspect of the invention, the composite digital signal transmitted to each remote user unit includes a code signal indicating the desired operating conditions of both the selector means and the data compression, multiplexer, data expansion and demultiplexer means. Each remote user unit includes means for detecting these code signals and for configuring the unit's respective means, accordingly.

In still another aspect of the invention, loopback means are interposed between various elements of the remote user unit, the DLC units, and the central office terminal, for use in selectively testing the various elements of the units. In particular, each loopback means connects a signal being output by a particular element back into the element's receive terminal normally used for the signal being transmitted in the opposite direction. Selective operation of these loopback elements can be controlled, for example, by the code signals selectively transmitted from the central office to each remote user unit.

Other aspects and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 2 is a simplified block diagram of one remote user unit from the voice and data communication system of FIG. 1;

FIG. 3 is a simplified block diagram of the remote digital loop carrier, unit of FIG. 1;

FIG. 4 is a simplified block diagram of the central office digital loop carrier unit of FIG. 1; and FIG. 5 is a simplified block diagram of the central office terminal of FIG. 1.

DESCRIPTION OF THE PREFERRED EMBODIMENT

Figure 1:
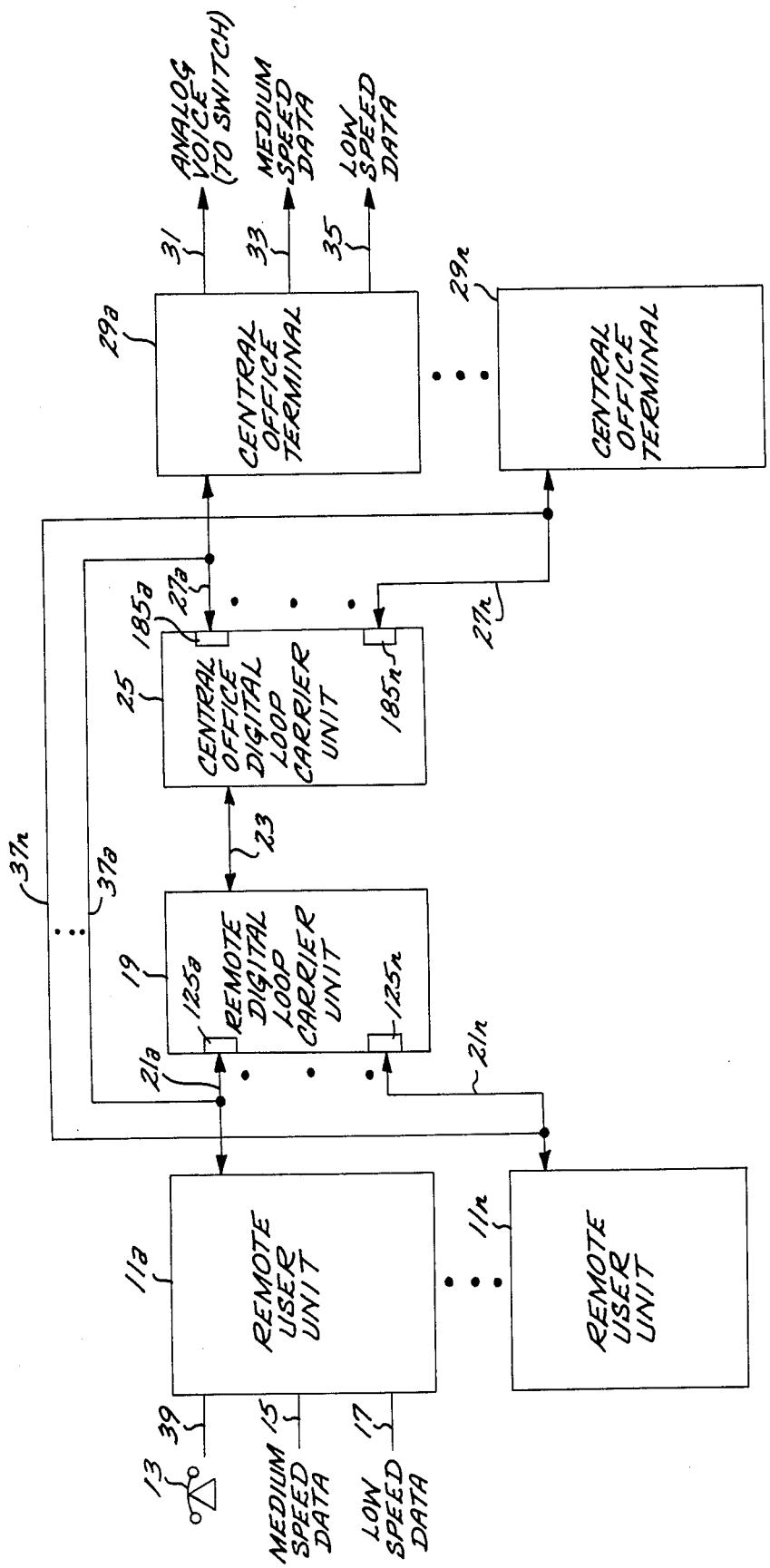
FIG. 1 is a simplified block diagram of a voice and data communication system for transmitting and receiving both voice and data signals to and from a number of remote users.

With reference now to the drawings, and particularly to FIG. 1, there is shown a communication system for transmitting and receiving both voice and digital data signals to and from a large number of remote users. Each remote user is provided with a separate remote user unit 11 for combining together voice and digital data signals and for transmitting and receiving such combined signals to and from a common central office. The remote user unit interfaces with an analog voice signal source such as a conventional full-duplex telephone unit 13, as well as lines 15 and 17 that carry medium and low speed digital data signals.

A remote digital loop carrier (DLC) unit 19 multiplexes together the combined voice and digital data signals supplied to it on lines 21a-21n from the various remote user units 11a-11n and transmits these multiplexed signals over a common DS1 line 23 to the central office. At this central office, a corresponding central office DLC unit 25 demultiplexes the signals that originated at the various remote user units and supplies these demultiplexed signals on lines 27a-27n to separate central office terminals 29a-29n. These terminals, in turn, separate the voice and digital data signals and direct them to predetermined destinations via lines 31, 33 and 35. Simultaneously, voice and data signals are transmitted back from the central office terminals to the various remote user units in a similar fashion. This provides full-duplex communication. In some instances, the voice and digital data signals can bypass the remote and central office DLC units 19 and 25, as indicated by the lines 37a-37n.

The specific units of the communication system of FIG. 1 are described in more detail with reference to FIGS. 2-5. FIG. 2 depicts one remote user unit 11, which combines voice and digital data signals for a particular remote user and transmits these signals over either a common line 21 to the remote DLC unit 19 or a common line 37 directly to the corresponding central office terminal 29. The remote user unit also receives back on line 21 (or 37) a similar grouping of voice and digital data signals and directs these signals to the appropriate input/output terminals 13, 15 and 17.

The remote user unit 11 receives a standard analog voice signal on line 39 from the telephone unit 13 and medium and low speed digital data signals on lines 15 and 17, respectively. The medium data signal, which can have a bit rate of up to 19.2-kilobits per second, is received through a standard RS-232 connector 41, and the low speed data signal, which can have a bit rate of up to 1.2-kilobits per second, is received through a second RS-232 connector 43. Return voice and data signals are also transmitted out through these respective terminals.

In accordance with the invention, the remote user unit 11 includes a transformer, CODEC and echo-canceling hybrid circuit 45 for digitizing the analog voice signal supplied on lines 39, a data compressor 47 for reducing the data rate of the digitized voice signal, and a multiplexer/demultiplexer 49 for time-division multiplexing together the compressed voice signal and the medium and low speed digital data signals supplied to the unit via the respective connectors 41 and 43. A modulator 50 subsequently modulates the multiplexed signal onto a carrier for ultimate output on line 21. The voice component of the output signal can be re-created subsequently, with substantially less distortion than occurs in prior voice and data communication systems of this kind. In addition, the reduction in the data rate of the digitized voice signal provided by the data compressor 47 makes sufficient bandwidth available for the digital data signals to permit higher data rates than were previously available in prior systems.

The remote user unit 11 includes two double-pole, double-throw switches 51 and 53 that are used to configure the unit in either of two operating modes, i.e., a SYSTEM mode or a POTS (Plain Old Telephone System) mode. In the SYSTEM mode, the unit operates as described briefly above, to digitize the analog voice signal received from the telephone unit 13 and to combine the digitized voice signal with two digital data signals. In the POTS mode, the unit simply transmits the analog voice signal without alteration.

More particularly, in the SYSTEM mode, the analog voice signal is coupled on lines 55 from the first switch 51 to the transformer, CODEC and echo-canceling hybrid circuit 45. This circuit performs the standard signaling functions commonly associated with telephone systems, including ring trip and off-hook signaling, as well as ring generation. In addition, the circuit includes a conventional DNIC (Data Network Interface Controller) device for digitizing the analog voice signal and an additional device for reducing the cross-coupling of the transmitted and received signals, which otherwise can create undesired echos. These functions are well known to those skilled in the telephone art and therefore need not be described in detail.

The transformer, CODEC and echo-canceling hybrid circuit 45 outputs the digitized voice signal on eight parallel lines 56 to a loopback device 57 and, in turn, on lines 58 to the data compressor 47. The CODEC's sample rate is 8 kilohertz, which is adequate for the 3.2 kilohertz analog voice bandwidth. The data compressor compresses these successive 8-bit bytes into corresponding 4-bit bytes at the same baud rate, using an adaptive, differential encoding algorithm. Such algorithms are well-known and need not be described in detail here. The compressed 4-bit bytes are transmitted on lines 59 to the multiplexer/demultiplexer 49. In addition, the medium speed data signal supplied to the unit 11 via the RS-232 connector 41 is transmitted on line 61 to a loopback device 63 and, in turn, on line 65 to the multiplexer/demultiplexer. Similarly, the low speed data signal supplied to the unit via the RS-232 connector 43 is transmitted on line 67 to a loopback device 69 and, in turn, on line 71 to the multiplexer/demultiplexer.

The multiplexer/demultiplexer 49 interleaves the successive 4-bit compressed voice samples with the medium and low speed digital data signals to form a 64-kilobit per second, 8-bit parallel signal for output on lines 73. Half of this data represents the original analog voice signal, while the remaining half represents the two digital data signals as well as certain control bits. These control bits are useful, for example, in signaling the central office and in providing headers and parity check. In addition, these control bits can include redundant encoding in the least significant bit position of each 8-bit byte, which is periodically eliminated in many conventional telephone links.

A buffer 75, which includes a universal-asynchronous receiver/transmitter (UART), receives the successive 8-bit parallel bytes on lines 73 from the multiplexer/demultiplexer 49. This buffer adds two framing bits to each 8-bit byte, and serializes the data to produce an 80-kilobit per second serial data signal, which is output on line 77. The two added framing bits for each 8-bit byte are, for example, grafted at the beginning and ending of each byte, to assist in subsequent de-encription.

The 80-kilobit per second digital signal is transmitted on line 77 from the buffer to a loopback device 79 and, in turn, on line 81 to the modulator 50, for modulation on an 80 kilohertz carrier. This modulated signal is then transmitted on line 83 to a transformer 85 and, in turn, on lines 87 to the switch 53, for output by the unit on line 21. The transformer is a conventional device that is impedance matched with a standard "U" interface or "DS0" line such as line 21.

As previously mentioned, the remote user unit 11 not only formats and transmits a combined voice and digital data signal, but also simultaneously receives back a similar combined voice and digital data signal. This latter receive signal is received on the same DS0 line 21 and connected through the switch 53 and lines 87 to the transformer 85. The receive signal is then coupled on line 89 to a demodulator 91, which demodulates it from its 80 kilohertz carrier to produce an 80-kilobit per second serial data signal. The serial data signal is transmitted on line 93 to the loopback device 79 and, in turn, on line 95 to the buffer 75. The buffer removes the framing bits immediately preceding and following each 8-bit byte and reformats the signal into a 64-kilobit per second, 8-bit parallel signal. The successive 8-bit parallel bytes are transmitted on lines 97 to the multiplexer/demultiplexer 49, which separates out the particular bits in each byte that represent the respective voice signal, medium speed digital data signal, and low speed digital data signal. The latter two signals are transmitted on lines 65 and 71, respectively, to the respective loopback devices 63 and 69 and RS-232 terminals 41 and 43.

The 4-bit bytes corresponding to the received voice signal are transmitted on lines 99 from the multiplexer/demultiplexer 49 to a data expander 101, which performs the inverse function of the data compressor 47. In particular, it expands each 4-bit byte into a corresponding 8-bit byte in accordance with the same adaptive, differential encoding algorithm. The expanded 8-bit bytes are then transmitted on lines 103 to the loopback device 57, and, in turn, on lines 104 to the transformer, CODEC and echo-canceling hybrid circuit 45, which converts the data back into its original analog format and properly buffers the signal for coupling through the switch 51 to the telephone unit 13.

The normal operating mode of the user unit 11 is the POTS mode, in which the analog voice signals bypass the unit's various digitizing and multiplexing functions via a full-duplex line 105. The unit automatically switches over to the SYSTEM mode upon receipt of a particular dual-tone, multifrequency (DTMF) signal on line 21 from the remote DLC unit 19 (or on line 37 of the central office terminal 29). In particular, a SYSTEM mode tone detector 107 monitors the bypass line 105 and generates an appropriate control signal when it detects the specified DTMF signal. This control signal is transmitted on line 109 to the multiplexer/demultiplexer 49, which, in turn, switches the two switches 51 and 53 to their SYSTEM positions via control line 111.

The remote user unit 11 returns to the POTS mode in either of two ways. First, if a significant failure (such as a power outage) is ever detected in any of the remote user unit's functional elements, the two switches 51 and 53 are automatically switched to their POTS positions. A self-diagnosis circuit 113 periodically scans certain test points in the remote user unit to ensure that the unit is operating properly. If this circuit ever detects that a failure has occurred, it terminates its periodic resetting via line 115 of a watchdog timer circuit 117, such that the timer circuit eventually reaches a prescribed number. When it does, the timer circuit outputs an appropriate control signal on line 119 to signal an alarm logic circuit 121 to instruct the multiplexer/demultiplexer 49 via line 123 that a return should be made to the POTS mode. The multiplexer/demultiplexer responds by inserting appropriate bits into its digital data output signal to indicate that a failure has occurred and that the unit will be switching to its POTS mode. Immediately thereafter, the multiplexer/demultiplexer switches the two switches 51 and 5 to their respective POTS positions via line 111.

A second way for the remote user unit 11 to switch back to the POTS mode from the SYSTEM mode is by the detection of a particular code in the signal the unit receives from the central office terminal 29 (FIG. 1) via the DS0 line 21. The multiplexer/demultiplexer 49 includes a special code detect circuit that monitors the incoming 8-bit bytes of the receive signal to detect when this particular code is received. When such a code is detected, the multiplexer/demultiplexer inserts an appropriate code of its own into the 8-bit transmit bytes, to indicate that the POTS mode code has been detected and it immediately thereafter switches the switches 51 and 53 via the control line 111.

Special code signals are also transmitted periodically to the remote user unit 11 from the central office terminal 29 to establish various operating parameters for the unit. These code signals can indicate, for example, the desired bit rates of the medium and low speed digital data signals, as well as certain conditions for the data compression algorithm implemented by the data compressor 47 and data expander 101. Following detection of each such format code signal, the multiplexer/demultiplexer outputs an appropriate reply code for transmission out on the DS0 line 21, to indicate that it has properly received the format code signal.

As mentioned above, the remote user unit 11 includes loopback devices 57, 63, 65 and 79 for use in selectively looping back the signals the unit is transmitting or receiving. This is useful in permitting an effective testing of limited portions of the unit, to isolate possible failures. Thus, for example, if the loopback device 79 is operating, the receive signal output by the demodulator 91 on line 93 is coupled back via line 81 to the input terminal of the modulator 50. This permits testing from the central office of just the modulator and demodulator, transformer 85 and switch 53 of the remote user unit. Similarly, operation of either of the loopback devices 63 and 69 permits selective testing of the entire digital data portion of the unit except for the two RS-232 connectors 41 and 43. Additional loopback devices can also be utilized to test other portions of the system, such as the RS-232 connectors themselves.

The composite digital signals output by the various remote user units 11 are transmitted on the DS0 lines 21a-21n to the remote DLC unit 19. This latter unit time-division multiplexes the various composite signals together, for transmission over a single "DS1" line 23 a considerable distance to the central office DLC unit 25. Simultaneously, the remote DLC unit delivers to the various remote user units over the same DS0 lines a similar set of composite digital signals, each including a compressed, digitized voice signal and medium and low speed digital data signals.

The remote DLC unit 19 includes separate interface cards 125a-125n (FIG. 1) for the respective remote user units 11a-11n, as well as common equipment to which all of the interface cards are connected. Each interface card demodulates the composite digital signal received from a particular remote user unit 11. Each such card also strips off the two signaling bits at the beginning and end of each 8-bit byte in the 80-kilobit per second data signal, to provide a 64-kilobit per second, 8-bit parallel data sequence. The 64-kilobit per second data sequences from all of the interface cards are supplied to the common equipment, which time-division multiplexes them together for transmission to the central office.

FIG. 3 depicts the common equipment 126 and one interface card 125 from the remote DLC unit 19. The interface card portion of the unit is divided into two sections. The upper section is utilized when the unit operates in the POTS mode, and the lower section is utilized when the unit operates in the system mode. A double-pole, double-throw switch 127 directs the signal supplied to the unit on the DS0 line 21 to either the upper, POTS mode section, or the lower, SYSTEM mode section.

When the signal supplied to the remote DLC unit 19 includes the digitized voice plus data signal, the switch 127 is in the SYSTEM position and the received signal is initially processed in a conventional transformer 129 that is properly matched to the DS0 line 21. From there, the received signal is carried on line 131 to a demodulator 133, which demodulates the signal to an 80-kilobit per second baseband digital data signal. This baseband signal is carried on line 135 to a loopback device 137 and, in turn, on line 139 to a buffer 141, which separates the signal into successive 10-bit bytes and then eliminates the two framing bits that were added to each 8-bit byte in the remote user unit 11. The buffer, which can include a conventional universal-asynchronous receiver/transmitter (UART) then outputs the successive 8-bit bytes in parallel on lines 143. An interface circuit 145 receives the successive 8-bit parallel bytes and, under the control of appropriate timing signals received on line 147 from the common equipment 126, outputs the data on line 149 to the common equipment for interleaving with the corresponding data similarly provided by other interface cards 125.

As previously mentioned, the remote DLC unit 19 further functions to transmit composite digital signals to each of its associated remote user units 11. Thus, the common equipment 126 supplies on line 151 to the interface circuit 145 of each interface card 125 a sequence of 8-bit bytes extracted from the time-division multiplexed signal it receives on the DS1 line 23. The interface circuit relays these 8-bit parallel bytes on lines 153 to the buffer 141, which grafts two framing bits onto the beginning and end of each byte and converts the parallel data into an 80-kilobit per second serial data signal. This signal is carried on line 155 to the loopback device 141 and, in turn, on line 157 to a modulator 159 for modulation on an 80-kilohertz carrier. The modulated carrier is then transmitted on line 161 to the transformer 129, which transmits it through the switch 127 to the DS0 line 21.

When merely analog voice signals are being transmitted over the DS0 line 21, the switch 127 is in the POTS position and only the upper, POTS mode section of the remote DLC unit 19 is operational. In this operating mode, the analog voice signal supplied to the unit is carried on lines 163 from the switch to a transformer and filter 165, which is properly matched to the DS0 line. This is a conventional circuit that further detects the standard ring trip and off-hook signals, for processing in a conventional fashion. From there, the suitably terminated analog voice signal is transmitted on line 167 to a sample and hold interface circuit 169, which, under the control of a timing signal supplied to it on line 171 from the common equipment 126, transmits digitized samples of the voice signal on line 173 to the common equipment, for interleaving with the signals provided by other interface cards 125. The transformer and filter, sample and hold interface circuit, and common equipment are all conventional circuits normally present in the prior DLC units of this general kind.

In a complementary fashion, the analog voice signal for transmission out to the remote user unit 11 is supplied in digital form by the common equipment 126 on line 175. The sample and hold interface circuit 169 converts this digitized signal back to its original analog format, for transmission on line 177 to the transformer and filter 165 and, in turn, on lines 163 to the switch 127 and the DS0 line 21.

As was the case with the remote user unit 11 described above, the interface card 125 of the remote DLC unit 19 includes a POTS-to-SYSTEM tone detector 178 that monitors via line 179 the analog voice signal being transmitted to the corresponding remote user unit 11. When it detects a prescribed DTMF signal, this detector outputs an appropriate control signal on line 180 to the interface circuit 145. The interface circuit responds by sending an appropriate code signal back to the central office terminal 29 indicating that the DTMF signal has been received. The interface circuit also outputs an appropriate control signal on line 181 to a POTS logic circuit 182 that switches the mode switch 127 to the POTS position via control line 183. Conversely, when the interface card 125 is situated in the SYSTEM mode, the POTS logic circuit 182 monitors via line 181 the successive 8-bit bytes received by the interface circuit 145 on line 151 from the common equipment 126. When the logic circuit detects a particular code instructing the card to switch back to the POTS mode, the circuit switches the POTS/SYSTEM switch 127 via line control line 183.

The loopback device 137 is utilized in the same fashion as the loopback devices of the remote user unit 11. In particular, when the interface circuit 145 detects a particular code in the successive 8-bit bytes it receives from the central office via the common equipment 126, it conditions the loopback device to connect the 80-kilobit per second serial data signal output by the buffer 141 on line 155 back on line 139 to an input terminal of the same buffer. This permits selective testing of the unit's common equipment, interface circuit and buffer.

The remote DLC unit 19 is typically located at least several miles from the central office, this distance underscoring the very need for the unit. By grouping together the signals from the various remote users and by transmitting these signals on a common DS1 line 23, the system can eliminate the need for connecting a separate cable between the central office and each remote user. In particular, when 24 remote user units feed into a single remote DLC unit, the signal transmitted on the DS1 line has a bit rate of about 1.5 megabits per second.

The central office DLC unit 2 receives the multiplexed signal carried on the DS1 line 23 from the remote DLC unit 19 and it demultiplexes this signal to re-create the modulated composite digital signals originally generated by the various remote user units 11a-11n. The central office DLC unit includes a significant amount of common equipment of the kind typically included in conventional DLC units and further includes separate interface cards 185a-185n for processing the signals associated with the various remote user units 11a-11n.

The common equipment 187 and one interface card 185 of the central office DLC unit 25 are depicted in FIG. 4. It will be observed that the depicted equipment is substantially identical to the remote DLC unit 19; the only significant difference is that the two units are depicted in reverse orientations.

More particularly, the signal received on the DS1 line 23 is initially processed by the common equipment 187, which demultiplexes the signal to produce a sequence of 8-bit bytes for each remote user. When a particular remote user is operating in the SYSTEM mode, so too is the corresponding interface card 185 of the central office DLC unit 25. In this mode, a double-pole, double-throw mode switch 189 is configured in the SYSTEM position, and the lower, SYSTEM mode section of the card is operational. The successive 8-bit bytes for this particular interface card 185 are supplied in serial form on line 191 from the common equipment to an interface circuit 193. The interface circuit converts the serial data into corresponding parallel data for transmission on lines 195 to a buffer 197, which grafts prescribed framing bits onto each byte and converts it into a corresponding serial data signal. These framing bits aid in subsequent detection of the data. This buffer can include a conventional universal-asynchronous receiver/transmitter (UART). The resulting 80-kilobit per second serial data signal is transmitted on line 199 to a loopback device 201 and, in turn, on line 203 to a modulator 205, for modulation on an 80-kilohertz carrier. The modulated signal is then supplied on line 207 to a transformer 209, of conventional design, for output on lines 211 to the mode switch 189 and the DS0 output line 27.

In the reverse direction, the modulated carrier signal received on the full-duplex DS0 line 27 is transmitted through the mode switch 189 and along lines 211 to the transformer 209, which is impedance matched to the DS0 line. The transformer, in turn, supplies this signal on line 213 to a demodulator 215, for demodulation to an 80l-kilobit per second serial data signal. This data signal is transmitted on line 217 to the loopback device 201 and, in turn, on line 219 to the buffer 197, for detection and removal of the framing bits associated with each 8-bit byte and for conversion into a corresponding 64-kilobit per second, 8-bit parallel data signal. This data signal is transmitted over lines 221 to the interface circuit 193, which, under the control of timing signals supplied to it on line 223 from the common equipment 187, serializes the signal and supplies it at the appropriate time intervals on line 225 to the common equipment.

When a given interface card 185 of the central office DLC unit 25 is intended to carry merely full-duplex analog voice signals, the mode switch 189 is switched to the POTS position and the upper, POTS mode section of the card is operational. The voice signal originally generated by the corresponding remote user is supplied to the upper section of the card in digital form on a transmit line 227. A sample and hold interface circuit 229 returns this digital signal to its original analog format and transmits the analog signal on line 231 to a filter and transformer 233 for output on lines 235 to the mode switch and, in turn the DS0 line 27.

In the reverse direction, the analog voice signal intended to be transmitted back to the same remote user is received by the filter and transformer 233 on the same full-duplex lines 235 and relayed, in turn, on line 236 to the sample and hold interface circuit 229. This circuit digitizes the analog voice signal and, under the control of appropriate timing signals received on line 237 from the common equipment 187, supplies a succession of 8-bit bytes to the common equipment on line 239. The filter and transformer, sample and hold interface circuit, and common equipment are all conventional circuits normally present in prior DLC units of this general kind.

In similar fashion to the interface cards 125 of the remote DLC unit 19, the interface cards 185 of the central office DLC unit 25 each include a POTS-to-SYSTEM DTMF signal detector 241 that monitors via line 243 the analog voice signal being transmitted to the corresponding remote user unit 11. When it detects a prescribed DTMF signal, this detector outputs an appropriate control signal on line 245 to the interface circuit 193. The interface circuit responds by sending an appropriate code signal back to the central office terminal 29 indicating that the DTMF signal has been received. The interface circuit also outputs an appropriate control signal on line 247 to a POTS logic circuit 249 that switches the mode switch 189 to the POTS position via control line 251.

Conversely, when the interface card 185 operates in the SYSTEM mode and it is desired to switch back to the POTS mode, the interface circuit 193 detects an appropriate code signal received in the digital data signal supplied from the central office terminal 29. The interface circuit responds by sending back to the central office terminal an appropriate code signal indicating that the POTS mode signal has been received and immediately thereafter outputs a control signal on line 247 to the POTS logic circuit 249, causing it to switch the mode switch 189 back to the POTS position via control line 251.

The loopback device 201 is utilized whenever the interface circuit 193 detects an appropriate code signal in the successive 8-bit bytes it receives from the central office terminal 29. The loopback device connects the demodulated 80-kilobit per second data signal output by the demodulator 215 back to the input terminal of the modulator 205, which then modulates the signal and returns it to the central office terminal. This permits the selective testing of the modulator, demodulator, transformer 209 and mode switch 189 of the interface card 185.

Each interface card 185 of the central office DLC unit 25 transmits the modulated data signal (or analog voice signal, in the POTS mode) on the DS0 line 27 to a separate central office terminal 29. The central office terminal returns the modulated signal to its baseband format, separates the voice data from the medium and low speed digital data signals, and re-creates the original analog voice signal. The analog voice signal, medium speed digital data signal, and low speed digital data signal are output by the central office terminal on lines 31, 33 and 35, respectively.

One central office terminal 25 is depicted in FIG. 5. It will be observed that the unit is substantially identical to the remote user unit 11. One difference is that the central office terminal unit is arranged on the sheet with the DS0 line 27 located on its left side, rather than its right side. Another difference is that the central office terminal further includes a manually-operable mode switch 253 for use in selecting the POTS or SYSTEM operating mode and a control data terminal 255 for use in the selective testing and control of the system's various units, for example, using the various loopback devices.

As shown in FIG. 5, the central office terminal unit 25 includes two double-pole, double-throw switches 257 and 259 for use in configuring the unit to operate in either the POTS mode or the SYSTEM mode. When the switches are positioned in their POTS mode positions, which occurs when analog voice signals are being transmitted and received, the signals are carried on a full-duplex line 261 that essentially bypasses the entire unit.

When the unit operates in the SYSTEM mode, on the other hand, the modulated data signal supplied on the DS0 line 27 from the central office DLC unit 25 (or directly from a remote user unit 11 along the bypass line 37-see FIG. 1) is transmitted on lines 263 from the switch 257 to a transformer and echo-canceling hybrid circuit 265. This circuit is matched to the DS0 line and outputs a single-ended signal on line 267. A demodulator 269 demodulates the signal to produce an 80-kilobit per second serial data signal that is carried on line 271 to a loopback device 273 and, in turn, on line 275 to a buffer 277. The buffer, which can include a conventional universal-asynchronous receiver/transmitter (UART) strips off the framing bits previously grafted onto each 8-bit byte and converts the serial signal to a corresponding sequence of 8-bit parallel bytes. A multiplexer/demultiplexer 279 receives these successive bytes on lines 281 and separates them into their constituent segments, i.e., the digitized and data compressed voice signal, the medium speed digital data signal, and the low speed digital data signal. The multiplexer/demultiplexer outputs these three data segments on lines 283, 285 and 287, respectively.

A data expander 289 expands the successive 4-bit bytes of the data compressed voice signal back to its original 8-bit format. This expander uses the same data compression algorithm as was used in the data expander 101 of the remote user unit 11. The 8-bit bytes are then transmitted on lines 291 to an echo-canceling hybrid, CODEC and transformer circuit 293, for conversion back to its original analog format. The resulting analog signal is supplied on lines 295 to the mode switch 259 and subsequently output on line 31 to further central office equipment (not shown) such as an analog switch for routing the signal to any desired destination.

In the reverse direction, the analog voice signal intended to be transmitted out to a particular remote user is received on the line 31 and transmitted through the switch 259 and lines 295 to the echo-canceling hybrid, CODEC and transformer circuit 293. This circuit is properly matched to the impedance level of the central office interface line 31 and it converts the signal to a corresponding sequence of 8-bit bytes. This circuit can advantageously include a conventional DNIC circuit. The digitized audio signal is transmitted in parallel form on lines 297 to a data compressor 299 which compresses the 8-bit bytes into corresponding 4-bit bytes using the same data compression algorithm as is used in the data compressor 47 of the corresponding remote user unit 11. The resulting sequence of 4-bit bytes is transmitted on lines 301 to the multiplexer/demultiplexer 279, for time-division multiplexing with the medium and low speed data signals supplied to the multiplexer on lines 303 and 305, respectively.

The time multiplexed signal is transmitted on lines 305 from the multiplexer/demultiplexer 279 to the buffer 277, which grafts onto each 8-bit byte predetermined framing bits for subsequently assisting in the proper detection of the bytes. The buffer also converts these bytes into a corresponding serial data signal using a conventional UART device. The serial data signal is carried on line 307 to the loopback device 273 and, in turn, on line 309 to a modulator 311, for modulation on an 80-kilohertz carrier. This modulated carrier is then transmitted on line 313 to the transformer and echo-canceling hybrid circuit 265, which interfaces properly with the DS0 line 27.

The medium and low speed digital data signals output by the multiplexer/demultiplexer 279 on lines 285 and 287, respectively, are supplied to separate digital data connectors 315 and 317, via separate loopback devices 319 and 321 and lines 323 and 325, respectively. The two RS-232 connectors can be connected, in turn, to suitable cabling (not shown in FIG. 5) to carry the respective medium and low speed digital data signals to any desired destinations. As previously mentioned, the medium speed signal has a maximum bit rate of 19.2 kilobits per second and is suitable for use in carrying data to and from a personal computer and the low speed signal has a maximum data rate of 1.2 kilobits per second and is suitable for use in carrying signaling data for burglar and fire alarms, utility meters, and the like.

As previously mentioned, the central office terminal 29 further includes a control data terminal 255 for use in inputting suitable control signals for use in testing the system's various units and in configuring the system's various selectable features such as POTS/SYSTEM mode and data rates. This control information is supplied on lines 327 to the multiplexer/demultiplexer 279 for incorporation into the successive 8-bit bytes it transmits out to the central office and remote DLC units 25 and 19, respectively, and to its corresponding remote user unit 11. Reply information is transmitted back to the control terminal 255 via line 329.

The manually-actuated mode switch 253 is included to permit a manual overriding of any code signals input through the control data terminal 255 and to configure all of the interface cards and units associated with the central office terminal 29 into either the POTS mode or the SYSTEM mode. This switch is connected to the multiplexer/demultiplexer via line 331.

As was the case with the remote user unit 11 described above, the central office terminal 29 includes a self-diagnosis circuit 333 that periodically scans certain test points located throughout the terminal, seeking to detect any possible failures that might have occurred. If such a failure is detected, the circuit terminates its periodic resetting via line 335 of a watchdog timer circuit 337. When this timer circuit thereafter times out, it signals an alarm logic circuit 339 via line 341 to send an appropriate control signal on line 343 to the multiplexer/demultiplexer 279. The multiplexer/demultiplexer, in turn, outputs appropriate code signals on line 329 to the control data terminal 255 and switches the two POTS/SYSTEM switches 257 and 259 to their respective POTS positions, via control line 345. This failure mode ensures that the system will operate properly as a conventional analog voice telephone system when any significant failure is detected in the central office terminal.

It should be appreciated from the foregoing description that the present invention provides a significantly improved telephone communication system that transmits and receives simultaneously not only voice signals but also medium and low speed digital data signals. The system digitizes and data compresses the original analog voice signals and then time-multiplexes this compressed signal with the two digital data signals to produce a composite signal that requires no more bandwidth than is required by previous systems. Despite using no greater bandwidth, the voice signal can be reconstructed with minimal distortion and the two digital data signals can be transmitted at data rates significantly higher than was previously possible. In addition, the system is adapted to detect certain failures in its various units and to then selectively switch to an operating mode in which merely analog voice signals are transmitted and received.

Although the invention has been described in detail with reference to the presently preferred embodiment, those skilled in the art will appreciate that various modifications can be made without departing from the invention. Accordingly, the invention is limited only by the following claims.

I claim:

1. A voice communication system comprising:
   voice means for supplying an analog voice signal having a predetermined bandwidth;
   analog-to-digital converter means for converting the analog voice signal to a corresponding digital voice signal having a predetermined data rate;
   data compression means for converting the digital voice signal to a compressed voice signal having a reduced data rate;
   data means for supplying a first digital data signal;
   multiplexer means for time-division multiplexing the compressed voice signal and the first digital data signal to produce a composite digital signal;
   selector means for selectively connecting to an output terminal either the analog voice signal or the composite digital signal; and
   transmitter means for transmitting the signal connected to the output terminal by the selector means.

2. A voice communication system as defined in claim 1, wherein the selector means includes:
   means for detecting a failure in either the analog-to-digital converter means, the data compression means, or the multiplexer means, and for producing a corresponding control signal; and
   means responsive to the control signal for selectively connecting the analog voice signal to the output terminal.

3. A voice communication system as defined in claim 1, wherein:
   the data means further supplies a second digital data signal;
   the multiplexer means time-division multiplexes the compressed voice signal and the first and second digital data signals to produce the composite digital signal; and
   the data rate of the composite digital signal is no greater than the data rate of the digital voice signal.

4. A voice and digital data telephone communication system comprising:
   a plurality of remote user units for simultaneously transmitting and receiving combined voice and digital data signals;
   a plurality of central office units for simultaneously transmitting and receiving combined voice and digital data signals; and
   means for interconnecting each remote user unit with a separate central office unit, such that each remote user unit transmits a first combined voice and digital data signal to a predetermined, corresponding central office unit and receives back from the same central office unit a second combined voice and digital data signal;
   wherein each of the remote user units includes
      voice terminal means for supplying a first analog voice signal having a predetermined bandwidth,
      analog-to-digital converter means for converting the first analog voice signal to a corresponding first digital voice signal having a predetermined data rate, data compression means for converting the first digital voice signal to a first compressed voice signal having a reduced data rate, data terminal means for supplying a first digital data signal, multiplexer means for time-division multiplexing the first compressed voice signal and the first digital data signal to produce the first combined voice and digital data signal, for transmission to the predetermined, corresponding central office unit via the interconnecting means, demultiplexer means for time-division demultiplexing the second combined voice and digital data signal received from the predetermined, corresponding central office unit via the interconnecting means, to produce a second compressed voice signal and a second digital data signal, the second digital data signal being output by the data terminal means, data expansion means for decompressing the second compressed voice signal to produce a corresponding second digital voice signal, and digital-to-analog converter means for converting the second digital voice signal to a corresponding second analog voice signal for output by the voice terminal means;

and wherein each of the central office units includes
voice terminal means for supplying a second analog voice signal having a predetermined bandwidth, analog-to-digital converter means for converting the second analog voice signal to a corresponding second digital voice signal having a predetermined data rate, data compression means for converting the second digital voice signal to a compressed voice signal having a reduced data rate, data terminal means for supplying a second digital data signal, multiplexer means for time-division multiplexing the second compressed voice signal and the second digital data signal to produce the second combined voice and digital data signal for transmission to the predetermined corresponding remote user unit via the interconnecting means, demultiplexer means for time-division demultiplexing the first combined voice and digital data signal received from the predetermined, corresponding remote user unit via the interconnecting means, to produce a first compressed voice signal and a first digital data signal, the first digital data signal being output by the data terminal means, data expansion means for decompressing the first compressed voice signal to produce a corresponding first digital voice signal, and digital-to-analog converter means for converting the first digital voice signal to a corresponding first analog voice signal for output by the voice terminal means.

5. A voice and digital data telephone communication system as defined in claim 10, wherein:

each of the plurality or remote user units further includes selector means for selectively transmitting to the predetermined, corresponding central office unit via the interconnecting means either the first combined voice and digital data signal or the first analog voice signal;

each of the plurality of central office units further includes selector means for selectively transmitting to the predetermined, corresponding remote user unit via the interconnecting means either the second combined voice and digital data signal or the second analog voice signal;

when one of the plurality of central office units receives the first analog voice signal via the interconnecting means, its selector means selectively connects the received signal directly to its voice terminal means; and when one of the plurality of remote user units receives the second analog voice signal via the interconnecting means, its selector means selectively connects the received signal directly to its voice terminal means.

6. A voice and digital data telephone communication system as defined in claim 5, wherein:

each of the plurality of remote user units further includes means for detecting a failure in one or more elements of the remote user unit and, when that occurs, for conditioning the selector means to selectively transmit the first analog voice signal and to selectively connect the received second analog voice signal directly to the voice terminal means; and each of the plurality of central office units further includes means for detecting a failure in one or more elements of the central office unit and, when that occurs, for conditioning the selector means to selectively transmit the second analog voice signal and to selectively connect the received first analog voice signal directly to the voice terminal means.

7. A voice and digital data telephone communication system as defined in claim 4, wherein the interconnecting means includes:

means for time-division multiplexing the signals transmitted by the plurality of remote user units, to produce a first multiplexed signal suitable for transmission over a predetermined distance;

first means for time-division demultiplexing the first multiplexed signal, to re-create the signals originally transmitted by the plurality of remote user units;

means for connecting the signals re-created by the demultiplexing means to separate ones of the plurality of central office units;

means for time-division multiplexing the signals transmitted by the plurality of central office units, to produce a second multiplexed signal suitable for transmission over a predetermined distance;

second means for time-division demultiplexing the second multiplexed signal, to re-create the signals originally transmitted by the plurality of central office units; and means for connecting the signals re-created by the second demultiplexing means to separate ones of the plurality of remote user units.

8. A voice and digital data telephone communication system as defined in claim 4, wherein each of the plurality of remote user units further includes loopback means for use in selectively transmitting the received second combined voice and digital data signal in place of the first combined voice and digital data signal.

9. A voice and digital data telephone communication system as defined in claim 4, wherein:

the multiplexer means of each central office unit is adapted to selectively incorporate a format code signal into the second combined voice and digital data signal, the format code signal indicating a desired operating condition of the predetermined, corresponding remote user unit; and the demultiplexer means of each remote user unit includes means for detecting the format code signal in the second combined voice and digital data signal and for configuring the remote user unit accordingly.

10. A voice and digital data telephone communication system as defined in claim 4, wherein:

the data rate of the first combined voice and digital data signal is no greater than the data rate of the first digitized voice signal; and the data rate of the second combined voice and digital data signal is no greater than the data rate of the second digitized voice signal.

11. A voice and digital data telephone communication system as defined in claim 4, wherein each of the remote user units further includes:

first loopback means interposed between the data expansion means and the data compression means for selectively connecting the second digital voice signal to the data compression means, in place of the first digital voice signal; and second loopback means interposed between the demultiplexer means and the multiplexer means, for selectively connecting the second digital data signal to the multiplexer means, in place of the first digital data signal.

12. A voice and digital data telephone communication system comprising:

a plurality of remote user units for simultaneously transmitting and receiving combined voice and digital data signals;

a corresponding plurality of central office units for simultaneously transmitting and receiving combined voice and digital data signals; and means for interconnecting each remote user unit with a separate central office unit, such that each remote user unit transmits a first combined voice and digital data signal to a predetermined, corresponding central office unit and receives back from the same central office unit a second combined voice and digital data signal;

wherein each of the remote user units includes voice terminal means for supplying a first analog voice signal having a predetermined bandwidth, analog-to-digital converter means for converting the first analog voice signal to a corresponding first digital voice signal having a predetermined data rate, data compression means for converting the first digital voice signal to a first compressed voice signal having a reduced data rate, data terminal means for supplying a first digital data signal, multiplexer means for time-division multiplexing the first compressed voice signal and the first digital data signal to produce the first combined voice and digital data signal, for transmission to the predetermined, corresponding central office unit via the interconnecting means, demultiplexer means for time-division demultiplexing the second combined voice and digital data signal received from the predetermined, corresponding central office unit via the interconnecting means, to produce a second compressed voice signal and a second digital data signal, the second digital data signal being output by the data terminal means, data expansion means for decompressing the second compressed voice signal to produce a corresponding second digital voice signal, and digital-to-analog converter means for converting the second digital voice signal to a corresponding second analog voice signal for output by the voice terminal means, and selector means for selectively transmitting to the predetermined, corresponding central office unit via the interconnecting means either the first combined voice and digital data signal or the first analog voice signal;

wherein each of the central office units includes voice terminal means for supplying a second analog voice signal having a predetermined bandwidth, analog-to-digital converter means for converting the second analog voice signal to a corresponding second digital voice signal having a predetermined data rate, data compression means for converting the second digital voice signal to a compressed voice signal having a reduced data rate, data terminal means for supplying a second digital data signal, multiplexer means for time-division multiplexing the second compressed voice signal and the second digital data signal to produce the second combined voice and digital data signal for transmission to the predetermined corresponding remote user unit via the interconnecting means, demultiplexer means for time-division demultiplexing the first combined voice and digital data signal received from the predetermined, corresponding remote user unit via the interconnecting means, to produce a first compressed voice signal and a first digital data signal, the first digital data signal being output by the data terminal means, data expansion means for decompressing the first compressed voice signal to produce a corresponding first digital voice signal, and digital-to-analog converter means for converting the first digital voice signal to a corresponding first analog voice signal for output by the voice terminal means, and selector means for selectively transmitting to the predetermined, corresponding remote user unit via the interconnecting means either the second combined voice and digital data signal or the second analog voice signal;

wherein when one of the plurality of central office units receives the first analog voice signal via the interconnecting means, its selector means selectively connects the received signal directly to its voice terminal means;

wherein when one of the plurality of remote user units receives the second analog voice signal via the interconnecting means, its selector means selectively connects the received signal directly to its voice terminal means;

and wherein the interconnecting means includes means for time-division multiplexing the signals transmitted by the plurality of remote user units, to produce a first multiplexed signal suitable for transmission over a predetermined distance, first means for time-division demultiplexing the first multiplexed signal, to re-create the signals originally transmitted by the plurality of remote user units, means for connecting the signals re-created by the demultiplexing means to separate ones of the plurality of central office units, means for time-division multiplexing the signals transmitted by the plurality of central office units, to produce a second multiplexed signal suitable for transmission over a predetermined distance, second means for time-division demultiplexing the second multiplexed signal, to re-create the signals originally transmitted by the plurality of central office units, and means for connecting the signals re-created by the second demultiplexing means to separate ones of the plurality of remote user units;

and wherein the multiplexer means of each central office unit is adapted to selectively incorporate a format code signal into the second combined voice and digital data signal, the format code signal indicating a desired operating condition of the predetermined, corresponding remote user unit, and the demultiplexer means of each remote user unit includes means for detecting the format code signal in the second combined voice and digital data signal and for configuring the remote user unit accordingly.

13. A combined voice and digital data communication system comprising:

voice terminal means for supplying an analog voice signal having a predetermined bandwidth;

analog-to-digital converter means for converting the analog voice signal to a corresponding digital voice signal having a predetermined data rate, the digital voice signal being arranged in a succession of 8-bit bytes;

data compression means for converting the digital voice signal to a compressed voice signal having a reduced data rate, the compressed voice signal being arranged in a succession of 4-bit bytes;

data terminal means for supplying a first digital data signal;

control terminal means for supplying a digital control signal;

multiplexer means for time-division multiplexing the compressed voice signal with the digital data signal and the digital control signal to produce a combined voice and digital data signal arranged in a succession of 8-bit bytes;

modulator means for modulating the combined voice and digital data signal onto a carrier; and transmitter means for transmitting the modulated carrier.

14. A combined voice and digital data communication system as defined in claim 13, wherein the digital voice signal, compressed voice signal and combined voice and digital data signal all have substantially the same baud rate.

15. A method of communicating voice and data signals comprising steps of:

supplying an analog voice signal having a predetermined bandwidth;

converting the analog voice signal to a corresponding digital voice signal having a predetermined data rate;

data compressing the digital voice signal to produce a compressed voice signal having a reduced data rate;

supplying a first digital data signal;

time-division multiplexing the compressed voice signal and the first digital data signal to produce a composite digital signal;

selectively connecting to an output terminal either the analog voice signal or the composite digital signal; and transmitting the signal connected to the output terminal in the step of selectively connecting.

16. A method of communicating voice and data signals as defined in claim 15, wherein the step of selecting includes steps of:

detecting a failure in either of the steps of converting, data compressing, or time-division multiplexing, and producing a corresponding control signal; and selectively connecting the analog voice signal to the output terminal in accordance with the control signal.

17. A method of communicating voice and data signals as defined in claim 15, wherein:

the method further includes a step of supplying a second digital data signal;

the step of time-division multiplexing the compressed voice signal and the first and second digital data signals to produce the composite digital signal; and the data rate of the composite digital signal is no greater than the data rate of the digital voice signal.

18. A voice communication system comprising:

voice means for supplying a first analog voice signal having a predetermined bandwidth;

analog-to-digital converter means for converting the first analog voice signal to a corresponding first digital voice signal having a predetermined data rate;

data compression means for converting the first digital voice signal to a first compressed voice signal having a reduced data rate;

data means for supplying a first digital data signal;

multiplexer means for time-division multiplexing the first compressed voice signal and the first digital data signal to produce a first composite digital signal;

selector means for selectively connecting to an output terminal either the first analog voice signal or the first composite digital signal;

wherein the system receives at the output terminal a second composite digital signal, for transmission in a direction opposite to the direction of the first composite digital signal;

demultiplexer means for time-division demultiplexing the second composite digital signal to produce a second compressed voice signal and a second digital data signal;

data expansion means for decompressing the second compressed voice signal to produce a corresponding second digital voice signal; and digital-to-analog converter means for converting the second digital voice signal to a corresponding second analog voice signal;

wherein the selector means further selectively directs the second composite digital signal to either the demultiplexer means or the voice means.

19. A voice communication system as defined in claim 18, wherein:
the second composite digital signal includes a code signal indicating the desired condition of the selector means; and
the system further includes means for detecting the code signal in the second composite digital signal and for directing the second composite digital signal to either the demultiplexer means or the voice means accordingly.

20. A voice communication system as defined in claim 18, wherein:
the second composite signal includes a code signal indicating prescribed data rates for one or more of the first and second compressed voice signals and the first and second digital data signals; and
the system further includes means for detecting the code signal in the second composite signal and for adjusting the data compression means, multiplex means, data expansion means, or demultiplexer means, accordingly.

21. A voice communication system as defined in claim 22, wherein the central office apparatus further includes loopback means for selectively connecting the received first composite digital signal to the means for interconnecting, in place of the second composite digital signal.

22. A voice communication system as defined in claim 18, and further including:
a central office apparatus; and
means for interconnecting the output terminal with the central office apparatus, to transmit the first composite digital signal from the output terminal to the central office apparatus and the second composite digital signal from the central office apparatus to the output terminal;
the central office apparatus including
means for re-creating the first analog voice signal from the first composite digital signal,
means for creating the second composite digital signal based in part on a second analog voice signal, and
a switch array for directing the re-created first analog voice signal to a predetermined location and for receiving the second analog voice signal therefrom.

23. A voice communication system as defined in claim 22, wherein the interconnecting means includes:
means for time-division multiplexing the first composite digital signal with other, similar signals to produce a multiplexed signal suitable for transmission over a predetermined distance; and
means for time-division demultiplexing the multiplexed signal, to extract the first composite digital signal.

24. A voice communication system as defined in claim 18, and further including loopback means interposed between the multiplexer means and the demultiplexer means for selectively connecting the received second composite digital signal to the output terminal, in place of the first composite digital signal.

25. A voice and digital data telephone communication system as defined in claim 4, wherein each of the plurality of central office units further includes loopback means for selectively connecting the received first combined voice and digital data signal to the means for interconnecting, in place of the second combined voice and digital data signal.

26. A method of communicating voice and data signals comprising steps of:
supplying a first analog voice signal having a predetermined bandwidth;
converting the first analog voice signal to a corresponding first digital voice signal having a predetermined data rate;
data compressing the first digital voice signal to produce a first compressed voice signal having a reduced data rate;
supplying a first digital data signal;
time-division multiplexing the first compressed voice signal and the first digital data signal to produce a first composite digital signal;
selectively connecting to an output terminal either the first analog voice signal or the first composite digital signal;
receiving at the output terminal a second composite digital signal;
time-division demultiplexing the second composite digital signal to produce a second compressed voice signal and a second digital data signal;
data decompressing the second compressed voice signal to produce a corresponding second digital voice signal;
converting the second digital voice signal to a corresponding second analog voice signal; and
selectively connecting to a second output terminal either the second analog voice signal or the second composite digital signal.

27. A method of communicating voice and digital data signals as defined in claim 26, wherein:
the second composite digital signal includes a code signal indicating the desired results of the two steps of selectively connecting; and
the method further includes a step of detecting the code signal in the second composite digital signal and the steps of selectively connecting are performed accordingly.

28. A method of communicating voice and digital data signals as defined in claim 26, wherein:
the second composite signal includes a code signal indicating prescribed data rates for one or more of the first and second compressed voice signals and the first and second digital data signals; and
the method further includes steps of detecting the code signal in the second composite signal and adjusting the steps of data compressing, time-division multiplexing, data decompressing, or time-division multiplexing, accordingly.

29. A method of communicating voice and digital data signals as defined in claim 26, wherein:
the method utilizes a central office apparatus; and
the method further includes steps of interconnecting the output terminal with the central office apparatus and transmitting the first composite digital signal from the output terminal to the central office apparatus and the second composite digital signal from the central office apparatus to the output terminal;
the method further includes the following step performed at the central office apparatus:
re-creating the first analog voice signal from the first composite digital signal,
creating the second composite digital signal based in part on a second analog voice signal, and directing the re-created first analog voice signal to a predetermined location and receiving the second analog voice signal therefrom.

30. A method of communicating voice and digital data signals as defined in claim 29, wherein the step of interconnecting includes steps of:
   time-division multiplexing the first composite digital signal with other, similar signals to produce a multiplexed signal suitable for transmission over a predetermined distance; and
   time-division demultiplexing the multiplexed signal, to extract the first composite digital signal.

31. A voice communication system as defined in claim 18, and further including:
   first loopback means interposed between the data expansion means and the data compression means, for selectively connecting the second digital voice signal to the data compresion means, in place of the first digital voice signal; and
   second loopback means interposed between the demultiplexer means and the multiplexer means, for selectively connecting the second digital data signal to the multiplexer means, in place of the first digital data signal.

32. A method of communicating voice and data signals as defined in claim 29, wherein the steps performed at the central office apparatus further include a step of selectively looping back, for use in the step of interconnecting, the received first composite digital signal, in place of the second composite digital signal.

33. A method of communicating voice and digital data signals as defined in claim 26, and further including a step of selectively looping back the received second composite digital signal to the output terminal, in place of the first composite digital signal.

34. A method of communicating voice and data signals as defined in claim 26, and further including steps of:
   in the step of data compressing, selectively data compressing the second digital voice signal, produced in the step of data decompressing, in place of the first digital voice signal; and
   in the step of time-division multiplexing, selectively multiplexing the second digital data signal, produced in the step of time-division demultiplexing, in place of the first digital data signal.

* * * * *

UNITED STATES PATENT AND TRADEMARK OFFICE
CERTIFICATE OF CORRECTION

PATENT NO. : 4,740,963
DATED : April 26, 1988
INVENTOR(S) : Gordon P. Eckley

It is certified that error appears in the above-identified patent and that said Letters Patent is hereby corrected as shown below:

IN THE SPECIFICATION:

At column 9, line 47, change "2" to -- 25 --.

IN THE CLAIMS:

At column 15, line 62, change "10" to -- 4 --.

Signed and Sealed this

Twenty-seventh Day of December, 1988

Attest:

DONALD J. QUIGG

Attesting Officer

Commissioner of Patents and Trademarks